US008630452B2

(12) United States Patent
Mardirossian (10) Patent No.: US 8,630,452 B2
(45) Date of Patent: Jan. 14, 2014

(54) MAILBOXES AND MAILBOX SYSTEMS ENABLING ENHANCED SECURITY AND LOGISTICS, AND/OR ASSOCIATED METHODS

(75) Inventor: Aris Mardirossian, Potomac, MD (US)

(73) Assignee: Patents Innovations, LLC, Venice, FL (US)

( * ) Notice: Subject to any disclaimer, the term of this patent is extended or adjusted under 35 U.S.C. 154(b) by 119 days.

(21) Appl. No.: 13/196,582

(22) Filed: Aug. 2, 2011

(65) Prior Publication Data

US 2013/0034273 A1 Feb. 7, 2013

(51) Int. Cl.
*G06K 9/00* (2006.01)
(52) U.S. Cl.
USPC ............................... 382/101; 382/118
(58) Field of Classification Search
USPC .............. 382/101, 118; 209/584, 900
See application file for complete search history.

(56) References Cited

U.S. PATENT DOCUMENTS

| | | | | |
|---|---|---|---|---|
| 6,697,500 | B2 * | 2/2004 | Woolston et al. | 382/101 |
| 2004/0015453 | A1 | 1/2004 | Youngblood et al. | |
| 2004/0117326 | A1 | 6/2004 | Amato | |
| 2004/0260661 | A1 * | 12/2004 | Lytle | 705/402 |
| 2009/0222354 | A1 | 9/2009 | Murphy et al. | |

OTHER PUBLICATIONS

Mailbox Hidden Camera with Recording (DVR); http://www.brickhousesecurity.com/mailbox-camera.html, printed document dated Jul. 1, 2011, 4 pages.
www.TheMailboxMonitor.com; http://www.themailboxmonitor.com/, printed document dated Jul. 1, 2011, 3 pages.
Blue Legal Forms—Automated Postal Center and new Priority Mail Box Display; http://bluelegalfroms.com/automated-postal-center-and-new-priority-mail-box-display/, printed document dated Jul. 11, 2011, 4 pages.
Automated Postal Center Makes Mailing Quicker, Easier, More Convenient; http://www.usps.com/communications/newsroom/localnews/ny/2009/ny_2009_0601.htm; printed document dated Jul. 7, 2011, 1 page.

* cited by examiner

*Primary Examiner* — Jon Chang
(74) *Attorney, Agent, or Firm* — Nixon & Vanderhye P.C.

(57) ABSTRACT

A system is presented that enhances mail security and logistics. The system in certain example embodiments provides image capturing units to capture images of both the user and the items being mailed and tracks the items while maintaining some identity of the individual mailing the item. The system can in certain example embodiments perform facial recognition on the user and/or optical character recognition on the items being mailed in order to enhance the security of the mailing process.

21 Claims, 8 Drawing Sheets

MAILBOXES AND MAILBOX SYSTEMS ENABLING ENHANCED SECURITY AND LOGISTICS, AND/OR ASSOCIATED METHODS

Certain example embodiments relate to mailboxes and mailbox systems enabling enhanced security and logistics, and/or associated methods. More particularly, certain example embodiments relate to mailboxes and mailbox systems and/or associated methods in which images of both the person(s) mailing the object(s) and the object(s) being mailed are captured and associated with one another so that they are dynamically retrievable as the object(s) move through the delivery chain.

BACKGROUND AND SUMMARY OF EXAMPLE EMBODIMENTS

Conventional mail systems are widely used throughout the world to mail letters, parcels, or other items. Individuals can simply deposit their mailed items in a mailbox or give them to postal service personnel for delivery. For a reasonable price, items can be delivered across the country or even the world.

The postal system has provided great convenience for mailing items for over a hundred years. However, this system, though convenient, lacks significant security in identifying suspicious packages or tracking the individuals sending the packages and/or the package's origin.

Automated Postal Centers ("APC") provide better security for tracking individuals that send items using them. For example, APCs accept payment through credit/debit card only and sometimes have cameras at the units for taking pictures of the individuals mailing the items.

However, it is believed that the APCs do not perform any visual security processing of the parcel being mailed. Furthermore, these systems are only implemented at APCs and are not at all a part of a regular postal mailbox.

Thus, it will be appreciated that there is a need for a mail system that provides enhanced security for the everyday user that mails items.

In certain example embodiments, a system is presented that enhances mail security and logistics. The system provides image capturing units to capture images of both the user and the items being mailed and tracks the items while maintaining some identity of the individual mailing the item. The system can perform facial recognition on the user and/or optical character recognition on the items being mailed in order to enhance the security of the mailing process.

In certain example embodiments, a mailbox for enabling enhanced security and logistics of mailing objects is provided. The mailbox has an object reception unit having an opening for receiving an object, an image capturing unit for capturing a first image of a user of the mailbox and for capturing a second image of the object, and an image processing unit for associating the first and second images with each other.

According to an aspect of certain example embodiments, improved logistical features are provided such that, for instance, mailing labels, barcodes, or other delivery information that have been at initially read by the camera(s) on the original mailbox can be retrieved at a plurality of "touch points" in the postal delivery system for substantially real-time or live tracking purposes. Using this and/or other information, the image(s) of the person(s) mailing the objects also may be retrieved.

Another aspect of certain example embodiments relates to a mail system for enabling enhanced security and logistics of mailing objects. The mail system has a central computer having a central database and a mailbox. The mailbox can have an object reception unit having an opening for receiving an object, an image capturing unit for capturing a first image of a user of the mailbox and for capturing a second image of the object, an image processing unit for associating the first and second images with each other, and a data relay unit for relaying the associated first and second images to the central computer. The first and second images can be linked together in the central database in the central computer.

In a non-limiting, example implementation the image capturing unit further includes a first image capturing device for capturing the first image of the user of the mailbox and a second image capturing device for capturing the second image of the object.

In another non-limiting, example implementation the second image capturing device is placed in the vicinity of the opening and captures the second image of the object when the object is being inserted into the opening.

In yet another non-limiting, example implementation the first image capturing device captures the first image of the user while simultaneously capturing the second image of the object with the second image capturing device.

The mail system may also have a facial recognition unit for recognizing a face of the user of the mailbox and an optical character recognition unit for converting images on the object into text data. The recognized face and the text data can be submitted to a security device for security processing.

In a non-limiting, example embodiment the object is flagged if the security device determines that there is a security issue with the object and/or with the user.

In another non-limiting, example embodiment the image capturing unit captures a first image of the object before the object is inserted into the mailbox and then captures a second image of the object as the object is being inserted into the mailbox. The first and second images can be compared to each other and flagged if there is a discrepancy between the first and second images.

Another aspect relates to a mail processing system. The mail processing system can have a first mailbox having a first opening of a first size, a second mailbox having a second opening of a second size, where the second size is different from the first size, a sorting unit for sorting objects inserted into the first and second mailboxes based on a size of the object, and a security device for performing security processing on the objects inserted into the mailboxes.

In a non-limiting, example embodiment the second mailbox is bigger in size than the first mailbox and the second size is bigger than the first size.

In another non-limiting, example embodiment the security device flags an object if it is inserted into an opening of a mailbox of a wrong size.

The features, aspects, and advantages described above may be combined in any suitable combination or sub-combination to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF CERTAIN EXAMPLE EMBODIMENTS

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details described below. In other instances, detailed descriptions of well-known methods, devices, techniques, etc., are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on non-transitory computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., at least one processor and those input devices and output devices that are appropriate to perform the process.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

Certain example embodiments of the present system relate to enhanced mail security and logistics for daily users of mail systems. Although not limited to this domain, this system can be implemented at post office centers, post office mailboxes, and individual home or business mailboxes.

Figure 1:
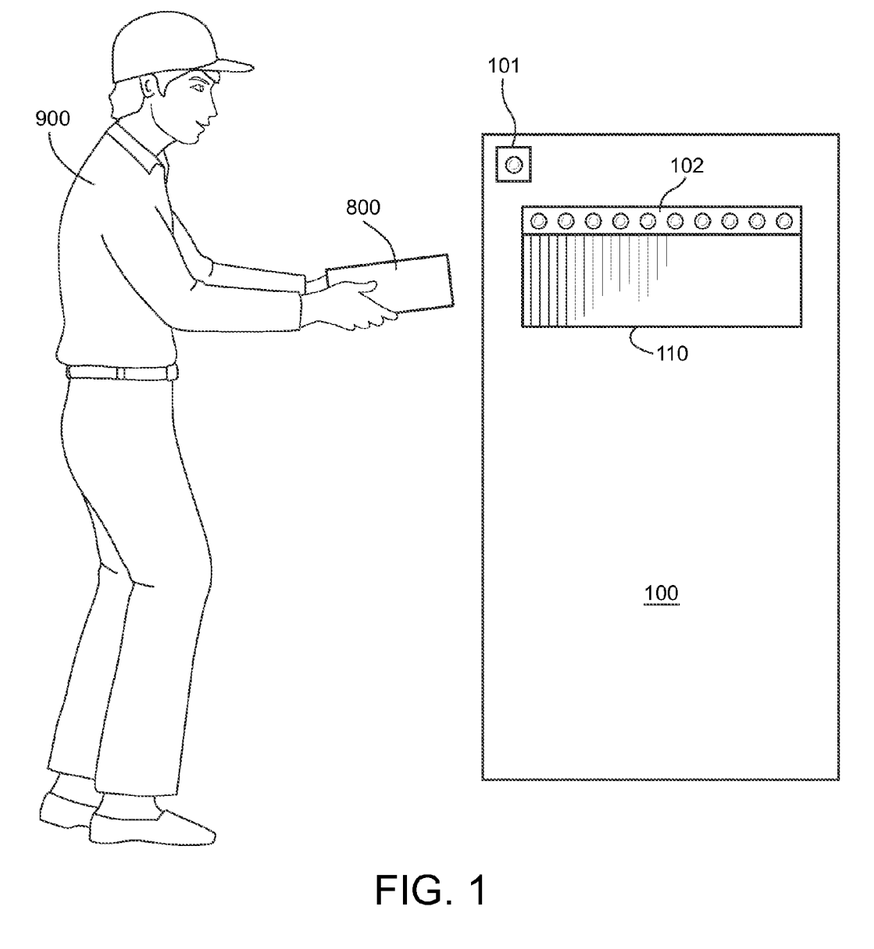
FIG. 1 is a diagram of an example embodiment of the present system.

FIG. 1 shows a diagram of an example mailbox 100 for accepting a mailing item 800 sent from a user 900 in accordance with an example embodiment. The mailbox 100 has a face image capture unit 101 for capturing an image of a face of the user 900 and an item image capture unit 102 for capturing an image of the mailing item 800. The user 900 can insert the mailing item 800 into an opening 110 in the mailbox 100 where the mailbox 100 can capture the image of the user 900 using the face image capture unit 101 and also capture the image of the mailing item 800 using the item image capture unit 102. Although not shown in FIG. 1, the mailbox 100 can also have a data relay unit 103 for relaying data related to the captured image data. The mailbox 100 can also be configured to perform various processing related to the captured image data.

FIG. 1 shows only one face image capture unit 101. However, it should be appreciated that multiple face image capture units may be used and positioned in various locations on the mailbox 100. FIG. 1 also shows only one item image capture unit 102, but it should be appreciated that there can be multiple item image capture units, in which these units can be, for example, placed in different positions on or inside the opening 110 of the mailbox 100. Of course, the item image capture units can also be placed on any other location of the mailbox 100 and does not have to be limited to the opening 110. It should also be appreciated that any of the image capture devices can be, for example, a camera for capturing pictures of the user and/or items. The presence of multiple image capturing units may be desirable, for example, to provide redundancy or backup in the event that one or more of units fail. The presence of multiple image capturing units also may be desirable, for example, to compare images of the mailing item 800 before, during, and/or after insertion in the opening 110 and thereby facilitate a comparison between these and/or other images, e.g., to verify that an accurate capture has been taken and to help ensure that the item 800 being mailed has not been exchanged or altered prior to mailing.

Figure 2:
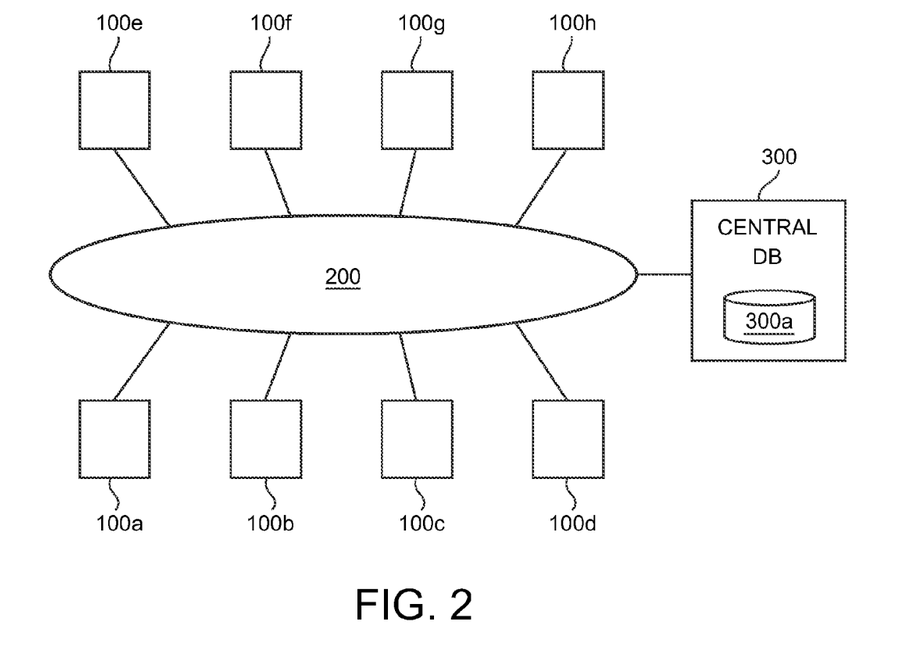
FIG. 2 is a diagram of an example embodiment of the present system implemented using multiple devices that communicate data to a central computing device.

FIG. 2 shows an example diagram of multiple mailboxes 100a-h communicating over a network 200 to a central computer 300. The central computer 300 can have, for example, a central database 300a for storing data sent from the multiple mailboxes 100a-h. Although FIG. 2 shows the mailboxes 100a-h communicating over a network, each mailbox 100a-h can submit data to a central computing device 300, or any other device using any other particular medium of data transfer such as, for example, a portable memory device (e.g., a USB memory). It should also be appreciated that the example shown in FIG. 2 is not limiting on the number of networks, mailboxes, and/or central computing devices and multiple configurations can be employed in implementing this system. Although a central database 300a is shown in FIG. 2, it will be appreciated that the database 300a may be distributed across multiple systems in certain example embodiments. In certain other example embodiments, multiple databases may be provided, e.g., for local, regional, statewide, federal, national, or other purposes or logical groupings.

Figure 3:
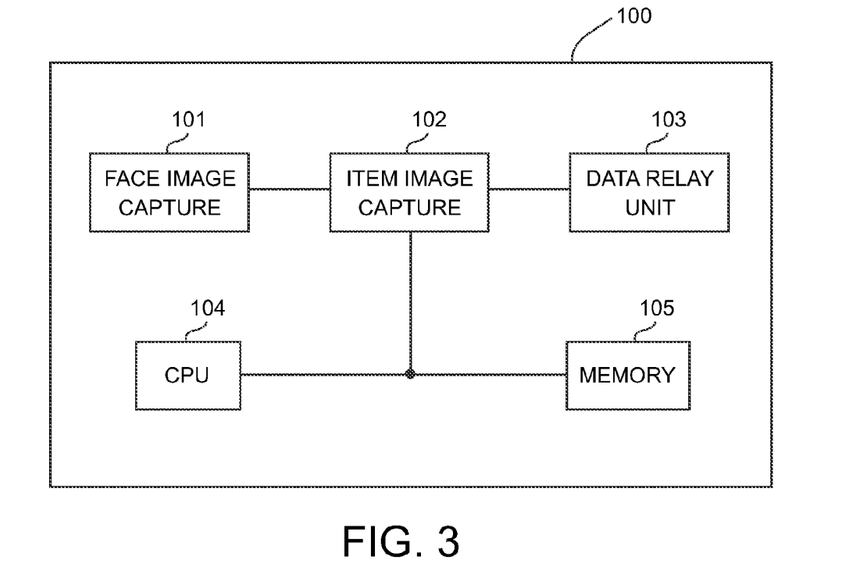
FIG. 3 is a block diagram of a mailbox unit in accordance with an example embodiment of the present system.

FIG. 3 shows a block diagram of an example embodiment of a mailbox 100. Although not limited to this embodiment, the mailbox 100 has one or more processors 104 and one or more memories 105. The processors and memory are used in conjunction with the overall mailbox system in processing image data and associating the processed image data, as discussed further below.

The mailbox 100 also contains a face image capture unit 101, an item image capture unit 102, and a data relay unit 103. In an example embodiment, the face image capture unit will capture an image of a face of the mailbox 100 user so that a face can be associated with an item being mailed. The item image capture 102 likewise captures an image of the item being mailed. In this manner, the mailbox 100 can effectively match an image of a mailbox user and an item being mailed so that this information can be tracked as the item traverses the mail system. The mailbox 100 is also equipped with a data relay unit 103 for relaying various data related to, for example, the image capture data captured by the face image capture unit 101 and the item image capture unit 102.

In an example embodiment, the data relay unit 103 is a form of wireless communication that can communicate with a wireless network, such as a wireless LAN or a data cellular network. However, the data relay unit 103 is not limited to this embodiment and can be wired, as well. Furthermore, the data relay unit 103 may also be a medium for transmitting data using a portable electronic memory device, such as a USB memory key.

Figure 4:
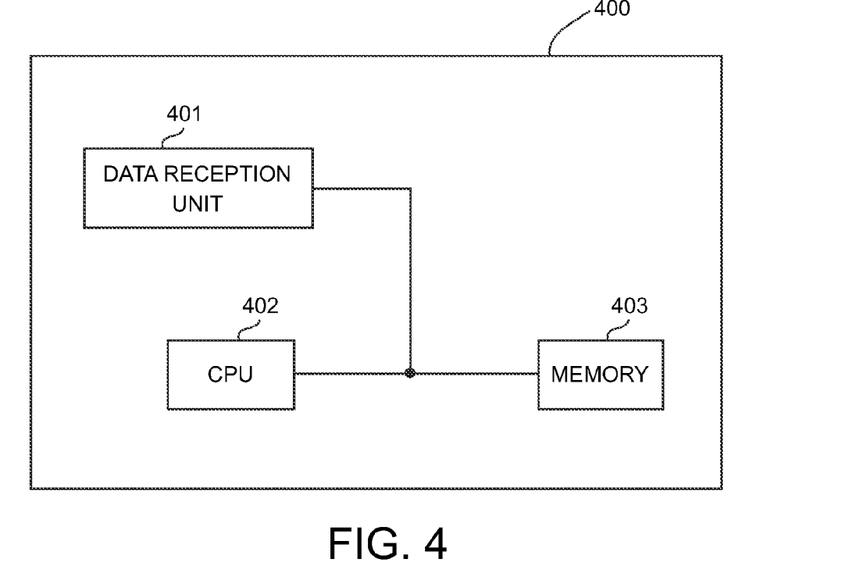
FIG. 4 is a block diagram of a central computing device in accordance with an example embodiment of the present system.

FIG. 4 shows a block diagram of a central computing device 300 in accordance with an example embodiment. In an example embodiment, data will be transmitted from each mailbox 100 to the central computing device 300. Each central computing device 300 has a data reception unit 301 for receiving data from the mailboxes 100. The data reception unit 301 can be, for example, a form of wireless communication that can communicate with a wireless network, such as a wireless LAN or a data cellular network. However, the data reception unit 301 is not limited to this embodiment and can be wired, as well. Furthermore, the data reception unit 301 may also be a medium for transmitting data using a portable electronic memory device, such as a USB memory key.

The central computing device 300 also contains one or more processors 302 and one or more memories 303. The memory 303 can be used to hold, for example, a central database 300a (not shown in the drawings) for storing the information received from the various mailboxes 100.

Figure 5:
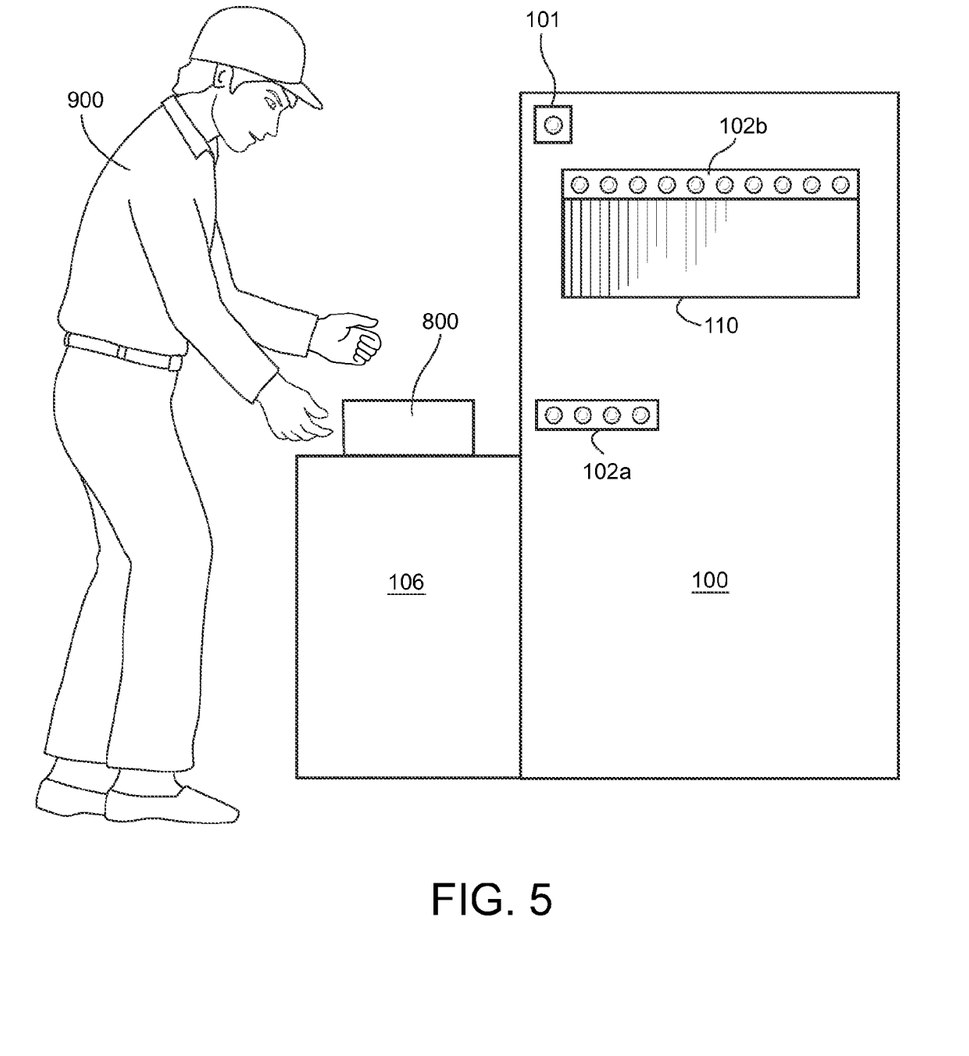
FIG. 5 is a diagram of another example embodiment of the present system.

FIG. 5 shows a diagram of another embodiment of the present system. Like the mailbox 100 of FIG. 1, the mailbox 100 in FIG. 5 has an opening 110 for receiving a mailing item 800, a face image capture unit 101 for capturing an image of a face of a user 900 and an item image capture unit 102b positioned in the vicinity of the opening 110 to capture an image of the mailing item 800.

In the vicinity of the mailbox 100 is an item pre-processing unit 106. In a preferred embodiment, the item pre-processing unit 106 is a calculation device for weighing and/or measuring an item 800. In the vicinity of the item pre-processing unit 106 is a second item image capture unit 102a. The second item image capture unit 102a can be used, for example, for capturing an image of the item 800 simultaneous with weighing and/or measuring the item 800 using the item pre-processing unit 106 and prior to inserting the item 800 into the opening 110.

After the pre-processing on the item 800 has been performed, the user 900 can then insert the mailing item 800 into an opening 110 in the mailbox 100 where the mailbox 100 can capture the image of the user 900 using the face image capture unit 101 and also or alternatively capture the image of the mailing item 800 using the item image capture unit 102b. Although not shown in FIG. 5, the mailbox 100 can also have a data relay unit 103 for relaying data related to the captured image data.

FIG. 5 shows only one face image capture unit 101. However, it should be appreciated that multiple face image capture units may be used and positioned in various locations on the mailbox 100. It should also be appreciated that a multitude of item image capture units 102a and 102b can be used on the mailbox 100. It should also be appreciated that any of the image capture devices can be, for example, a camera for capturing pictures of the user and/or items.

Figure 6:
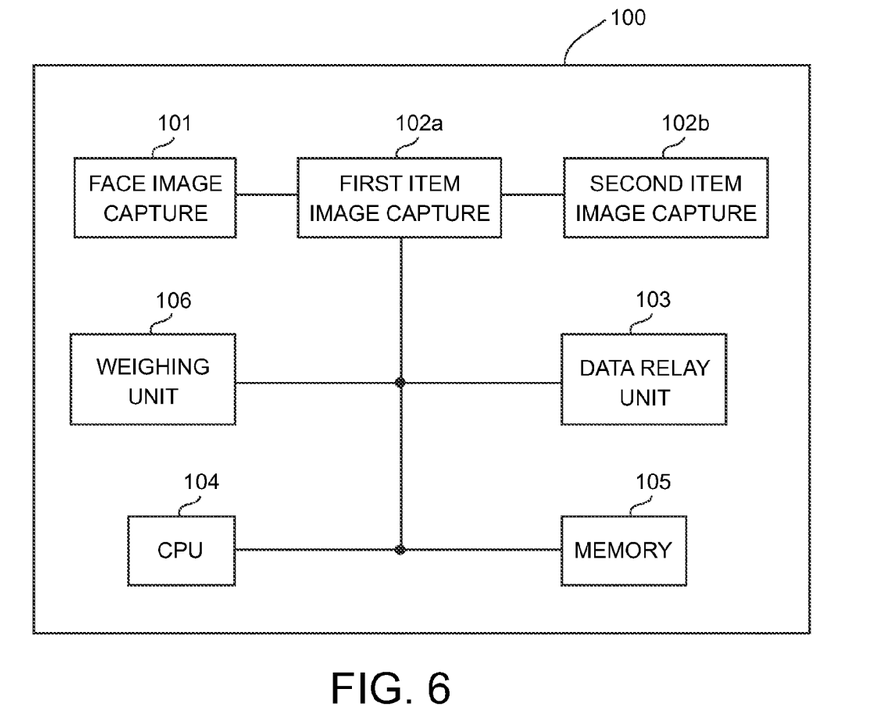
FIG. 6 is a block diagram of another example embodiment of a mailbox unit in the present system.

FIG. 6 shows a block diagram of another example embodiment of a mailbox 100 as depicted in FIG. 5. Although not limited to this embodiment, the mailbox 100 has one or more processors 104 and one or more memories 105. The processors and memory are used in conjunction with the overall mailbox system in processing image data and associating the processed image data, as discussed further below.

The mailbox 100 also contains a face image capture unit 101, a first item image capture unit 102a, a second item image capture unit 102b, and a data relay unit 103. In a preferred embodiment, the face image capture unit will capture an image of a face of the mailbox 100 user so that a face can be associated with an item being mailed. The item image capture units 102a and 102b likewise capture images of the item being mailed.

The mailbox 100 is also equipped with a data relay unit 103 for relaying various data related to, for example, the image capture data captured by the face image capture unit 101 and the item image capture unit 102. In a preferred embodiment, the data relay unit 103 is a form of wireless communication that can communicate with a wireless network, such as a wireless LAN or a data cellular network. However, the data relay unit 103 is not limited to this embodiment and can be wired as well. Furthermore, the data relay unit 103 may also be a medium for transmitting data using a portable electronic memory device, such as a USB memory key.

The mailbox 100 in this embodiment is also equipped with an item pre-processing unit 106 that can weigh and/or measure the item being mailed. In an example embodiment, a user will place the item on the pre-processing unit 106 and the mailbox 100 will automatically receive the measurement and weight of an item 800. In an example embodiment, the mailbox 100 will capture an image of a face of a user using the face image capture unit 101 and will capture a preliminary image of the item using the first item image capture unit 102a.

The mailbox 100 will have an image of the user and the item as well as the measurement and/or weight of the item being mailed. When the user inserts the item into the opening 110 of the mailbox 100, the second item image capture unit 102b will capture another image of the item 800 and can also capture another image of a face of the user 900 using the face image capture unit 101 again.

This embodiment provides an added layer of parity in that the pre-processing information prior to the package being ready for mailing can be compared to the actual item being inserted into the mailbox 100. In a preferred embodiment, if an image of the user and/or item at the time of pre-processing does not match an image of the user and/or item at the time of mailing, the system can track this information and even flag the item for security processing. In a further embodiment, the system may also prevent the user from mailing the item at all.

Figure 7:
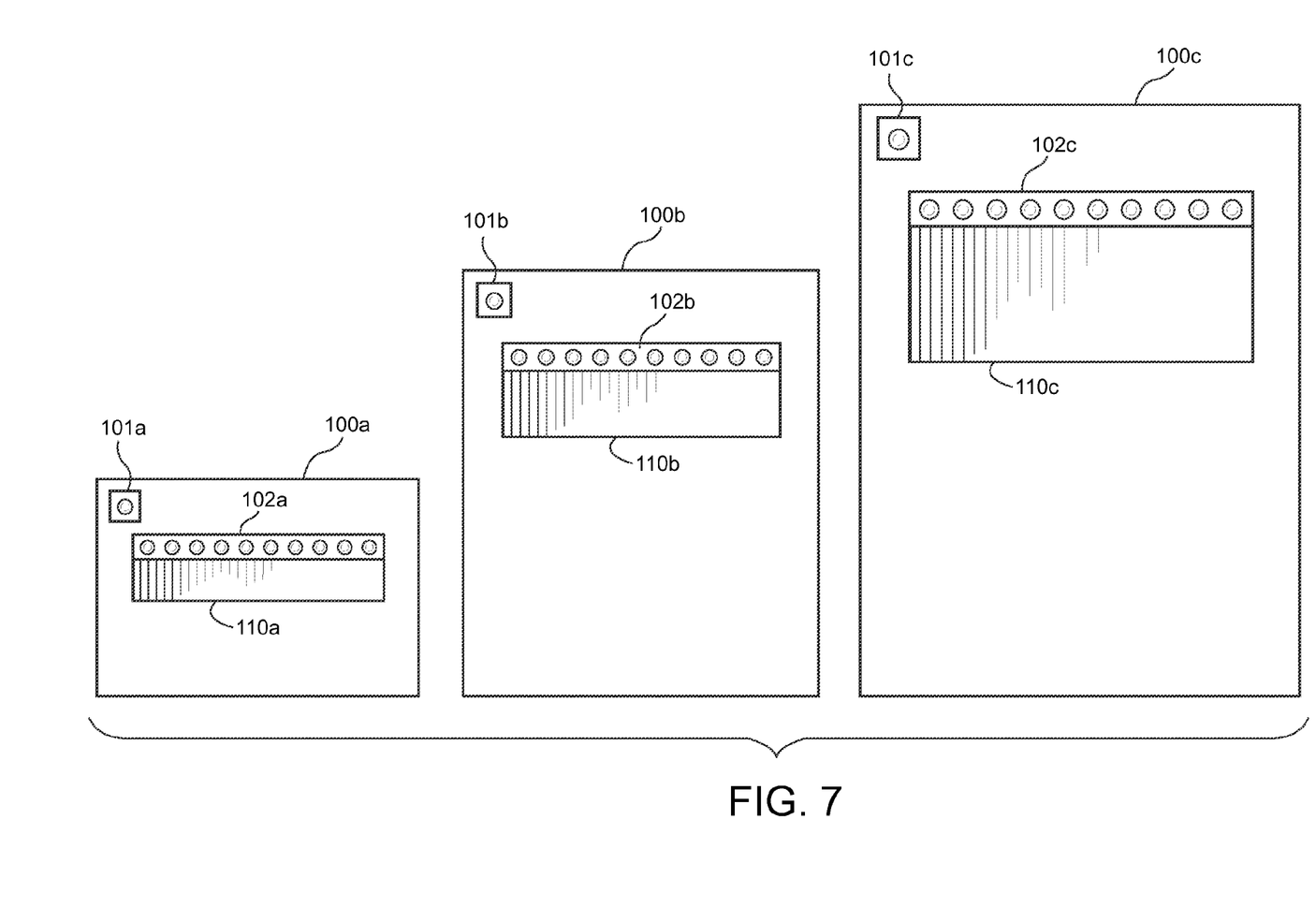
FIG. 7 is a diagram of another example embodiment of the mailbox systems in the present system.

FIG. 7 shows yet another example embodiment of the present system. In FIG. 7, multiple mailboxes 100*a-c* are shown with varying sizes. As can be seen in FIG. 7, the mailboxes 100*a-c* are ascending in size from small (mailbox 100*a*) to medium (mailbox 100*b*) to large (mailbox 100*c*). Like the mailboxes shown in FIGS. 1 and 5, each mailbox 100*a-c* is equipped with a face image capture unit 101*a-c* and an item image capture unit 102*a-c*. Each mailbox 100*a-c* has opening 110*a-c* that, as can be seen in FIG. 7, vary in size relative to the size of the mailbox 100*a-c*. Although not shown in FIG. 7, the mailboxes 100*a-c* can also have data relay units 103*a-c* for relaying data related to the captured image data.

In an example embodiment, the mailboxes 100*a-c* will only accept mailing items that fit or are relative to the size of the particular mailbox. Thus, for example, a small sized mailing item will be inserted into mailbox 100*a*, a medium sized mailing item will be inserted into mailbox 100*b*, and a large sized mailing item will be inserted into mailbox 100*c*.

The items inserted into each of the mailboxes 100*a-c* can be sorted and processed based on their varying sizes. In an example embodiment, if an item that is the wrong size is inserted into the wrong mailbox (e.g., a small sized package inserted into a large sized mailbox), the item can be flagged and submitted for security processing.

It should be appreciated that the mailboxes 100*a-c* shown in FIG. 7 can be designed so as to be separate units or can be combined such that they are one whole unit. For example, the mailbox 100*c* can have the openings 110*a* and 110*b* of mailboxes 100*a* and 100*b* in addition to its own opening 110*c* so that it may accept items of varying sizes. It should also be appreciated that the mailbox itself can sort and process the items being mailed based on their varying sizes.

Figure 8:
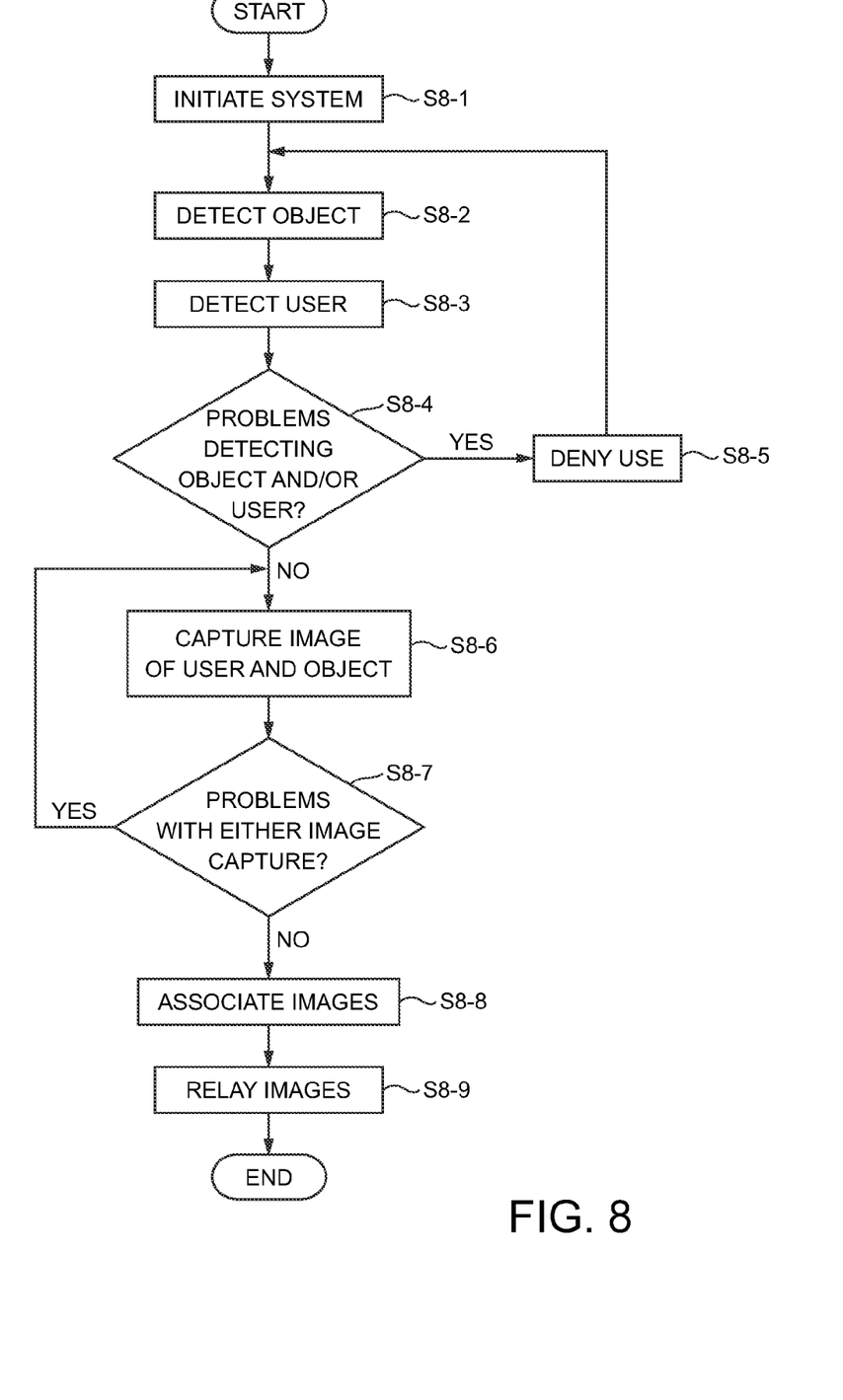
FIG. 8 is an application flowchart for certain example embodiments of the present system.

FIG. 8 is an application flowchart for certain example embodiments of the present system. The system begins in step S8-1 where the system is initiated. During system initiation, the system will perform a diagnostic of its various components and devices. If the system determines that any particular device is not operating properly, the system may use the data relay unit 103 to relay the information to another entity so that it may notify the entity of the problems in the mailbox 100. The system may also prevent further operation depending upon the extent of the problems diagnosed during system initiation. For instance, the mailbox 100 may be fully or partially disabled. A locking mechanism may be provided so as to prevent the associated door from opening, for example, in the event that the mailbox 100 as a whole is deemed unusable.

After the system initiates, the system proceeds to step S8-2 where it detects the presence of the mailing item. The system can detect the presence of the mailing item, for example, when the item is placed at or near the opening 110 of the mailbox 100.

After detecting the presence of the mailing item, the system proceeds to step S8-3 where it detects the presence of a user. The system can detect a user's presence, for example, using the face image capture unit 101 on the mailbox to determine that a user is about to use the mailbox 100 for mailing an item.

In step S8-4, the system determines if there are any problems in detecting the user and/or the mailing item. Although not limited to this embodiment, the system can determine if either image capture units are having a problem attempting to identify the presence of the mailing item and/or the user. For example, the lighting near the mailbox may be inadequate, thus reducing the ability of the image capturing units to obtain a visible image of the item or the user.

If there are any problems in detecting the mailing item or the user, the system will proceed to step S8-5 where it will deny use and then proceed back to step S8-2 where it will wait to detect the item and the user again. If there are no problems with detecting the mailing item and the user, the system will proceed to step S8-6 where it will capture the image of the user and the mailing item.

Similar to step S8-4, the system will determine if there is a problem with the image capture of the user's face or the mailing item in step S8-7. This threshold may be higher than the threshold for detecting the presence of a user and/or mailing item. That is, the system may be able to detect that a user is present and desiring to mail an item with a relatively low threshold. However, if the system cannot adequately capture the face of the user (e.g., the user is wearing a hat, helmet, ski mask, etc.) or if the system cannot adequately capture an image of the item being mailed and various information on the item being mailed (e.g., postage, return address, mailing address, etc.), the system will determine that there is a problem with either image capture. As such, the system will attempt to capture the image of the user and the mailing item again in step S8-6. In a preferred embodiment, the system will have a limit on how many times this process will run and will eventually prevent the user from mailing the item if problems with the image capture continue.

Once the system determines that there are no problems with capturing the image of the face of the user and the mailing item, the system proceeds to step S8-8 where it associates the images. In a preferred embodiment, the system will create a record of the mailing item in an internal memory of the mailbox and the record will be linked to both the mailing item and the image of the user. Further example details regarding this process are discussed with reference to FIG. 9.

After the images are associated with each other, the system proceeds to step S8-9 where it relays the images to, for example, a central computing device 300. The mailbox can relay this information using, for example, a data relay unit 103, as described above.

Figure 9:
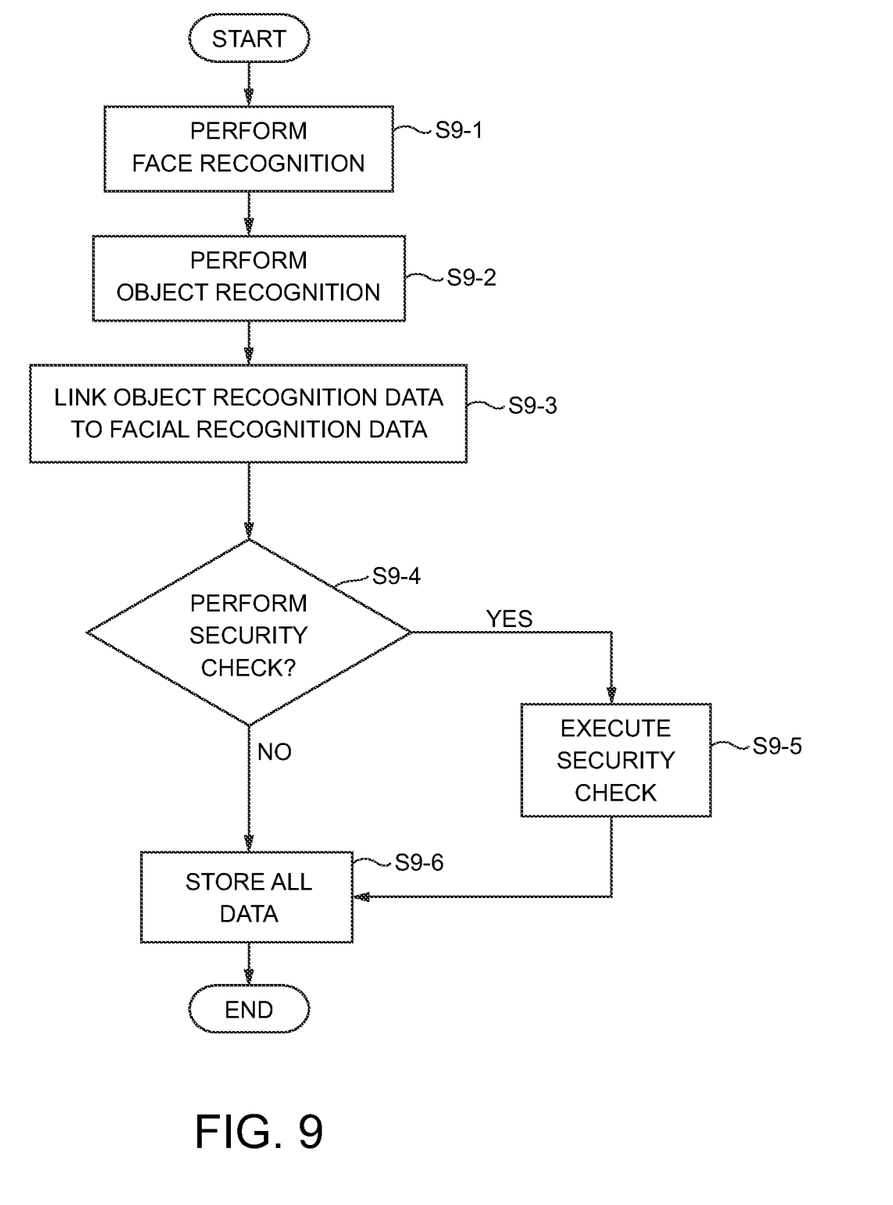
FIG. 9 is an application flowchart of an example of the image association process for certain example embodiments of the present system.

FIG. 9 is an application flowchart of an example of the image association process for certain example embodiments of the present system. In particular, FIG. 9 further explains the association of the image data and the transmission of the image data to a central computing device 300. It should be appreciated that all of the processes described in FIGS. 8-10 can be implemented on the mailbox 100 itself, at the central computing device 300, or on any other information processing device.

The system in FIG. 9 begins at step S9-1 where it performs facial recognition processing of an image of a face of the user, as acquired by the face image capture unit 101. In a preferred embodiment, the system will perform at least enough of a facial recognition process so that it can identify various features of a user's face (e.g., hair color, eye color, nose, lips). In a more preferred embodiment, the system will be able to process enough details during a facial recognition process so that it can successfully identify the user based on the facial features alone.

After performing the facial recognition of the user, the system proceeds to step S9-2 where it performs object recognition on the mailing item. In a preferred embodiment, the system will perform enough object recognition so that it identifies objects on the mailing item that should be present on a typical item being mailed (e.g., postage, mailing address, return address, etc.). Ideally, the system would also be able to detect anomalies on the package that may help it identify if the package is a security risk (e.g., sharp items sticking out of the package, unusual substances on the face of the package).

In an example embodiment, the system will also perform optical character recognition on the mailing item so that it can read any text on the item itself. For example, the system could perform an OCR operation so that it detects the return address and the mailing address, thereby identifying the item's source and destination while at the same time linking all of this information with images of both the item and the user mailing the item. For instance, in certain example embodiments, facial recognition may be performed on the person mailing the item and/or OCR may be performed on the package. If an anomaly is detected (e.g., if the person mailing the package is known to have a different full name or surname from the name detected on the return receipt, or is not known to be associated with a company identified on the package; if the person mailing the package is a known, wanted, or suspected criminal; etc.), the package may be flagged for further checking.

After the system performs its object recognition in step S9-2, the system proceeds to step S9-3 where it links the object recognition data to the facial recognition data. In an example embodiment, the system will create a record of the item being tracked and will link the image of the user and the object to the record in a database.

In an example embodiment, the system will be able to extract data during the facial recognition and object recognition so that the mailbox may automatically link this information with each other and the associated images. For example, the system may be able to identify the user as Joe Smith using the facial recognition process and then may be able to identify the user's return and mailing addresses using optical character recognition. Thus, for instance, if Joe Smith is mailing an item from his home to Dorothy Starbuck, the system can create a record containing Joe Smith's image and the image of his mailing item and also link these images to his personal information and the information indicated as the return and mailing addresses on the mailing item. This way, the system will quickly and accurately link the relevant information without having to perform additional, outside processing.

After linking this information, the system proceeds to step S9-4 where it determines if it will perform an additional security check on the mailing. If the system decides to perform the security check, the system will proceed to step S9-5 where it will perform security processing on the item to determine if the item should be identified as a potential security problem.

If the system foregoes security processing, or after security processing is completed, the system proceeds to step S9-6 where it stores the data collected in a memory. This data can be stored in the mailbox 100 or, in a preferred embodiment, will be stored in a central computing device 300 so that the information can be more easily accessed by a user for tracking and informational purposes. Further details of the security processing will be discussed with reference to FIG. 10, below.

Figure 10:
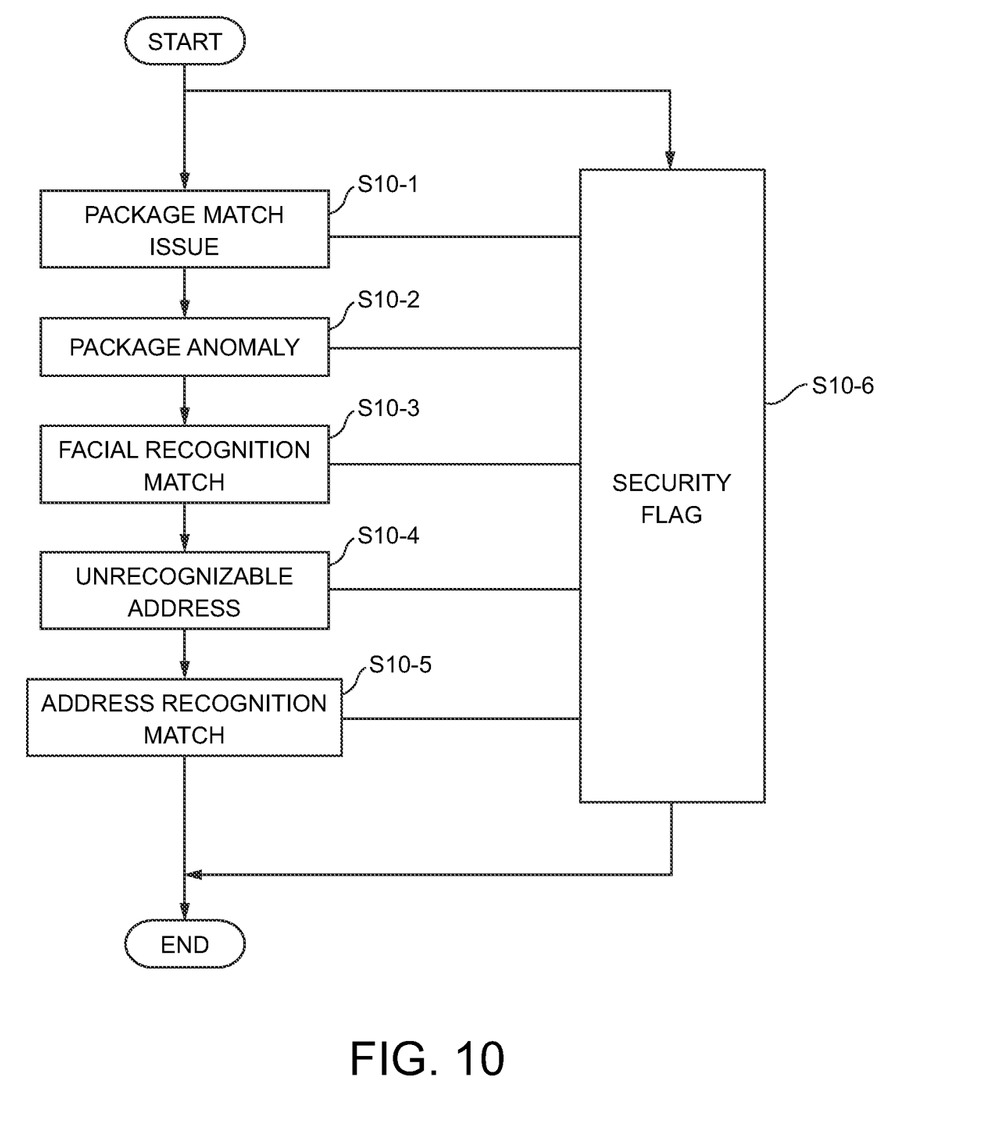
FIG. 10 is an application flowchart showing an example embodiment of the security processing for certain example embodiments of the present system.

FIG. 10 is an application flowchart showing an example embodiment of the security processing for certain example embodiments of the present system. In particular, FIG. 10 shows an example of some of the security processing techniques that are performed while the item is being mailed. It should be appreciated that the factors shown in FIG. 10 are in no way exhaustive or inclusive and any other security procedures can be implemented with respect to a user mailing an item. It should also be appreciated that the steps listed below are in no particular order and can be performed in any order or combination.

The system can being in step S10-1 where it will determine if there is an issue matching the package inserted into a mailbox with the package measured and/or weighed during pre-processing. This step is more relevant to the second embodiment where an image of the item being mailed and the user is taken during pre-processing and is taken again when the user inserts the package into the mailbox. If there are indicia that the package being inserted into the mailbox is not the same package as the one used during pre-processing, the system may flag this mailing item as a potential security issue. For example, if optical character recognition reads a significantly different address then the one detected during pre-processing, the system may flag the package for security processing.

In step S10-2, the system can also detect if there is an anomaly on the package. For example, the package may have a metal item sticking outside of the package, or the package may have an unusual substance on the surface of the package. If the system determines that an anomaly exists on the package, it may also flag the package as a potential security threat. X-ray, thermal imaging, and/or other analysis may be performed on the package in certain example embodiments to help detect anomalies.

In step S10-3, the system can also match the facial recognition data to a database to determine if the user is on any particular security list. For example, an individual may be on a homeland security list and if the facial recognition process determines the individual's identity and then determines that the individual is on the homeland security list, the system may flag the package as a potential security issue.

In step S10-4, the system can analyze the address information using the optical character recognition processing as discussed above. If there is any issue with the processing, such as the return or mailing address being unascertainable, the system may also flag the mailing item as a security issue.

In step S10-5, the system can also perform address recognition similar to the facial recognition process mentioned in step S10-3. That is, if an individual's return or mailing address identified through OCR techniques identifies a party as being on a particular security list, the system may flag the item for security processing. The address also may be checked against a list of predetermined places to determine whether extra security screening should take place. For instance, items to be mailed to the Capital, the private residence of a public official, etc., may be subject to extra automated screening and/or hand inspection.

If the item was flagged in any of the above steps, the system proceeds to step S10-6 where it can perform a variety of security processing techniques on the mailing item. In one embodiment, the system may merely flag the mailing item in the system noting that there is a potential security issue with the item. In another embodiment, the system may hold the item for further security processing and/or alert authorities that the item should be investigated. In yet another embodiment, the system may be able to affix some physical indicia on the item itself to notify a recipient that there is a potential security issue with the item.

In certain example embodiments (e.g., where the mailbox is located in a post office building or other area with sufficient space, or where the package is routed through a postal or other delivery facility), the package may be physically removed from a conveyor system. This may be facilitated through the identification and tracking techniques described herein. For instance, as indicated above, packages may be flagged at the point where they are mailed. Associated information such as, for example, why the package was flagged, where it was flagged, who mailed it, etc., may be made available at any time and/or place in the delivery chain. Thus, flagged packages may be removed from the delivery chain and optionally further analyzed or processed by human or automated techniques in potentially more secure environments and/or with potentially more advanced equipment. In certain example embodiments, it may be comparatively more easy to identify suspicious packages and obtain information about them, even as they are out for delivery or in the process of being delivered.

It should be appreciated that the system can also have different levels and/or criteria for determining what sort of security processing should be instituted. For example, if there is a minor discrepancy with the information collected during item pre-processing than with the information collected during item mailing, the system may only flag the item in the system as a minor security threat/issue. Likewise, for example, if a strange substance is detected on the face of the item being mailed, the system may accept the item, hold the item, and alert the authorities that there is a security issue with the item.

Although certain example embodiments have been described as providing improved security measures, it will be appreciated that the techniques disclosed herein may also help provide improved logistical information. For instance, the techniques disclosed herein may be used to retrieve detailed information at potentially any "touch point" within the delivery chain. This information may include, for example, a time/place of mailing, an image and/or name of the person mailing the item, whether (and possibly why) the item was flagged for security reasons, etc.

While the system has been described in connection with what is presently considered to be the most practical and preferred embodiment, it is to be understood that the system is not to be limited to the disclosed embodiment, but on the contrary, is intended to cover various modifications and equivalent arrangements included within the spirit and scope of the appended claims.

What is claimed is:

1. A mailbox for allowing enhanced security and logistics of mailing objects, the mailbox comprising:
    an object reception unit having an opening for receiving an object;
    an image capturing unit configured to capture a first image of a user of the mailbox and configured to capture a second image of the object;
    an image processing unit configured to associate the first and second images with each other;
    wherein the image capturing unit comprises a first image capturing device configured to capture the first image of the user of the mailbox and a second image capturing device configured to capture the second image of the object; and
    wherein the second image capturing device is located in the vicinity of the opening and is arranged to capture the second image of the object when the object is being inserted into the opening.

2. The mailbox of claim 1, wherein the image processing unit comprises:
    a memory;
    one or more processors; and
    a data relay unit configured to relay the associated first and second images to a central computer.

3. The mailbox of claim 1, wherein the first and second images are associated with each other and stored in a database in the central computer.

4. The mailbox of claim 1, wherein the image capturing unit further comprises:
    a facial recognition unit configured to recognize a face of the user of the mailbox; and
    an optical character recognition unit configured to convert images on the object into text data,
    wherein the recognized face and the text data are submittable to a security device for security processing.

5. The mailbox of claim 4, wherein the security device is configured to flag the object if it is determined that there is a security issue with the object and/or with the user.

6. A mailbox for allowing enhanced security and logistics of mailing objects, the mailbox comprising:
    an object reception unit having an opening for receiving;
    an image capturing unit configured to capture a first image of a user of the mailbox and configured to capture a second image of the object;
    an image processing unit configured to associate the first and second images with each other;
    wherein the image capturing unit comprises a first image capturing device configured to capture the first image of the user of the mailbox and a second image capturing device configured to capture the second image of the object; and
    wherein the first image capturing device is configured to capture the first image of the user while simultaneously capturing the second image of the object with the second image capturing device.

7. The mailbox of claim 6, wherein the second image capturing device is located in the vicinity of the opening and is arranged to capture the second image of the object when the object is being inserted into the opening.

8. A mailbox for allowing enhanced security and logistics of mailing objects, the mailbox comprising:
    an object reception unit having for receiving an object;
    an image capturing unit configured to capture a first image of a user of the mailbox and configured to capture a second image of the object;
    an image processing unit configured to associate the first and second images with each other; and
    wherein the image capturing unit is arranged to capture a first image of the object before the object is inserted into the mailbox and also is arranged to capture a second image of the object as the object is being inserted into the mailbox, the first and second images being compared to one another and flagged if there is a discrepancy between the first and second images.

9. A mail system for allowing enhanced security and logistics of mailing objects, the mail system comprising:
    a computer in communication with a database; and
    at least one mailbox remote from the computer, the at least one mailbox including:
        an object reception unit having an opening for receiving an object,
        an image capturing unit configured to capture a first image of a user of the mailbox and configured to capture a second image of the object,
        an image processing unit configured to associate the first and second images with each other,
        a data relay unit configured to relay the associated first and second images to the central computer,
    wherein the first and second images are linked together in the database; and
    wherein the image capturing unit is configured to capture a first image of the object before the object is inserted into the at least one mailbox and also is configured to capture a second image of the object as the object is being inserted into the at least one mailbox, the first and second images being compared to one another and flagged if there is a discrepancy between the first and second images.

10. The mail system of claim 9, wherein the image capturing unit further comprises a first image capturing device arranged to capture the first image of the user of the at least one mailbox and a second image capturing device arranged to capture the second image of the object.

11. The mail system of claim 9, wherein the mail system further comprises:
a facial recognition unit configured to recognize a face of the user of the at least one mailbox;
an optical character recognition unit configured to convert images on the object into text data; and
a security device,
wherein the recognized face and the text data are submitted to the security device for security processing.

12. The mail system of claim 11, wherein the object is flagged if the security device determines that there is a security issue with the object and/or with the user.

13. The mail system of claim 12, wherein the security device is a part of the at least one mailbox.

14. The mail system of claim 12, wherein the security device is a part of the computer.

15. A mail system for allowing enhanced security and logistics of mailing objects, the mail system comprising:
a computer in communication with a database; and
at least one mailbox remote from the computer, the at least one mailbox including:
an object reception unit having an openingeceivin an object,
an image capturing unit configured to capture a first image of a user of the mailbox and configured to capture a second image of the object,
an image processing unit configured to associate the first and second images with each other,
a data relay unit configured to relay the associated first and second images to the central computer,
wherein the first and second images are linked together in the database,
wherein the image capturing unit further comprises a first image capturing device arranged to capture the first image of the user of the at least one mailbox and a second image capturing device arranged to capture the second image of the object; and
wherein the first image capturing device configured to capture the first image of the user while simultaneously capturing the second image of the object with the second image capturing device.

16. A mail system for allowing enhanced security and logistics of mailing objects, the mail system comprising:
a computer in communication with a database; and
at least one mailbox remote from the computer, the at least one mailbox including:
an object reception unit having an opening for receiving an object,
an image capturing unit configured to capture a first image of a user of the mailbox and configured to capture a second image of the object,
an image processing unit configured to associate the first and second images with each other,
a data relay unit configured to relay the associated first and second images to the central computer,
wherein the mail system further comprises:
a facial recognition unit configured to recognize a face of the user of the at least one mailbox;
an optical character recognition unit configured to convert images on the object into text data; and
a security device,
wherein the recognized face and the text data are submitted to the security device for security processing,
wherein the object is flagged if the security device determines that there is a security issue with the object and/or with the user,
wherein at least one said mailbox includes a plurality of openings with different respective sizes,
the system further comprising a sorting unit configured to sort objects inserted into the different openings based on sizes of the objects.

17. The mail system of claim 16, wherein the security device is configured to flag an object if it is inserted into an opening of a mailbox of a wrong size.

18. A method comprising:
capturing an image of a person about to mail an object;
capturing one or more images of the object before, during, and/or after the object is placed into a mail receptacle;
storing each of the captured images in a database located on a server located remote from the mail receptacle;
receiving a request for information about a mailed object;
in response to the request, retrieving a database entry for the mailed object; and
wherein the captured images include at least the image of the person, as well as images of the object before and after the object is placed in the receptacle.

19. The method of claim 18, further comprising:
recognizing text on the object once the object has been placed in the receptacle, and
storing recognized text in the database together with each of the captured images.

20. The method of claim 19, further comprising:
scanning the database for anomalies and/or potential security concerns;
flagging an object for retrieval and/or further inspection in response to a detection of an anomaly and/or potential security concern.

21. The method of claim 18, wherein the database entry includes the captured images and substantially real-time delivery status information for the mailed object.

* * * * *